(12) United States Patent
Ranjan et al.

(10) Patent No.: US 9,613,021 B2
(45) Date of Patent: Apr. 4, 2017

(54) STYLE-BASED SPELLCHECKER TOOL

(71) Applicant: Red Hat, Inc., Raleigh, NC (US)

(72) Inventors: Rajesh Ranjan, Maharashtra (IN); Ankitkumar Patel, Maharashtra (IN)

(73) Assignee: Red Hat, Inc., Raleigh, NC (US)

( * ) Notice: Subject to any disclaimer, the term of this patent is extended or adjusted under 35 U.S.C. 154(b) by 413 days.

(21) Appl. No.: 13/917,391

(22) Filed: Jun. 13, 2013

(65) Prior Publication Data
US 2014/0372101 A1    Dec. 18, 2014

(51) Int. Cl.
*G06F 17/27* (2006.01)

(52) U.S. Cl.
CPC .......... *G06F 17/273* (2013.01); *G06F 17/274* (2013.01)

(58) Field of Classification Search
CPC ...... G06F 17/24; G06F 17/274; G06F 17/273; G06F 17/243; G06F 17/279; G06F 17/211; G06F 17/27; G06F 17/277; G06F 21/6227; G06F 17/2735; G06F 17/2795; G06F 17/3061; G06F 17/30684; G06F 8/00; G06F 9/4451; G06F 17/30867; G06F 17/2827; G06F 17/2872; G06F 17/21; G06F 17/245; G06F 17/2785; G06F 17/28; G09B 7/00; G09B 19/06; G09B 19/00; G09B 19/04; G10L 15/26; G10L 13/00; G10L 15/08; G10L 15/1822; G10L 17/26
USPC ........................ 704/1–10, 255, 257, 251, 270
See application file for complete search history.

(56) References Cited

U.S. PATENT DOCUMENTS

| 5,467,448 A * | 11/1995 | Hilton et al. ................. 715/235 |
| 6,470,306 B1 | 10/2002 | Pringle et al. |
| 7,398,199 B2 | 7/2008 | Gong |
| 7,853,874 B2 | 12/2010 | Schabes et al. |
| 8,299,943 B2 | 10/2012 | Longe |
| 2009/0076792 A1 | 3/2009 | Lawson-Tancred |
| 2012/0078616 A1 * | 3/2012 | White et al. ..................... 704/9 |

FOREIGN PATENT DOCUMENTS

| EP | 04725979 A4 | 1/2008 |
| WO | 2005096708 A2 | 10/2005 |
| WO | 2005096708 A3 | 10/2005 |

OTHER PUBLICATIONS

Singh, Anil Kumar. "A Computational Phonetic Model for Indian Language Scripts." 2006. Web. <http://citeseerx.ist.psu.edu/viewdoc/summary?doi=10.1.1.78.747>. Last accessed Jun. 12, 2013.

(Continued)

*Primary Examiner* — Huyen Vo
(74) *Attorney, Agent, or Firm* — Haynes and Boone, LLP

(57) ABSTRACT

Systems and methods for providing style-based spellchecking are provided. An example system includes a dictionary that includes one or more words in a language. At least one word in the dictionary is based on one or more styles of the language. The system also includes a language module that receives a user selection of the language in which to spellcheck a document. The system further includes a style module that receives a user selection of one or more selected styles of the language. The system also includes a spellchecking module that identifies in the document a word applicable to the one or more selected styles and that determines whether the dictionary includes one or more spellings of the word based on the one or more selected styles.

20 Claims, 4 Drawing Sheets

(56) References Cited

OTHER PUBLICATIONS

Aggrawal, Ritu. "Hindi Editor With Spell Checker." A Dissertation Submitted to Vinayaka Mission University, Salem. Sep. 2007. Web. <http://sanskrit.jnu.ac.in/rstudents/mphil/ritu-agrawal.pdf>. Last accessed Jun. 12, 2013.

SpellGuru for Hindi. Web. <http://www.bhashagiri.com/#>. Last accessed Jun. 12, 2013.

"List of Languages by Number of Native Speakers." Wikipedia. Web. <http://en.wikipedia.org/wiki/List_of_languages_by_number_of_native_speakers#Nationalencyklopedin_.282007.29>. Last accessed Jun. 12, 2013.

* cited by examiner

STYLE-BASED SPELLCHECKER TOOL

FIELD OF DISCLOSURE

The present disclosure generally relates to computing systems, and more particularly to spellchecking.

BACKGROUND

In computing, a spellchecker (or spellcheck) is an application program that flags words in a document that may be misspelled. A spellchecker may be a standalone application that is capable of operating on a block of text, or as part of a larger application, such as a word processor, e-mail client, electronic dictionary, or search engine. After detecting a typographical error, the spellchecker may provide a number of suggestions to help the user correct the typographical error.

BRIEF SUMMARY

This disclosure relates to style-based spellchecking. Methods, systems, and techniques for providing style-based spellchecking are disclosed.

According to an embodiment, a system for providing style-based spellchecking includes a dictionary that includes one or more words in a language. At least one word in the dictionary is based on one or more styles of the language. The dictionary includes first and second spellings of the at least one word, the first spelling is based on a first style of the language, the second spelling is based on a second style of the language, and the first and second spellings of the at least one word have a common meaning. The system also includes a language module that receives a user selection of the language in which to spellcheck a document. The system further includes a style module that receives a user selection of one or more selected styles of the language. The system also includes a spellchecking module that identifies in the document a word applicable to the one or more selected styles and that determines whether the dictionary includes one or more spellings of the word based on the one or more selected styles.

According to another embodiment, a method of providing style-based spellchecking includes receiving, by one or more processors, a user selection of a language in which to spellcheck a document. The method also includes receiving a user selection of one or more selected styles of the language. The method further includes identifying in the document a word applicable to the one or more selected styles. The method also includes determining whether a dictionary includes one or more spellings of the word based on the one or more selected styles. The dictionary includes one or more words in the language, and at least one word in the dictionary is based on one or more styles of the language, where the dictionary includes a plurality of spellings of the at least one word, a spelling of the plurality of spellings is based on a style of the one or more styles, and the plurality of spellings of the at least one word has a common meaning in the language.

According to another embodiment, a non-transitory machine-readable medium includes a plurality of machine-readable instructions that when executed by one or more processors are adapted to cause the one or more processors to perform a method including receiving a user selection of a language in which to spellcheck a document; receiving a user selection of one or more selected styles of the language; identifying in the document a word applicable to the one or more selected styles; and determining whether a dictionary includes one or more spellings of the word based on the one or more selected styles, the dictionary including one or more words in the language, and at least one word in the dictionary being based on one or more styles of the language, where the dictionary includes a plurality of spellings of the at least one word, a spelling of the plurality of spellings is based on a style of the one or more styles, and the plurality of spellings of the at least one word has a common meaning in the language.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

I. Overview
II. Example System Architecture
A. Style-Based Spellchecker
B. User Options and Preferences
C. Example Styles
III. Example Method
IV. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Languages grown in vast diversity generally have several dialects, styles, and forms of writing. In this context, multiple words can have the same or almost the same pronunciation and exactly the same meaning, but different spellings. In an example, Indo-Aryan languages (e.g., Hindi) may be written in one or more styles, and a user of the language may correctly spell the word in more than one way based on different styles. As such, it may be difficult for a spellchecker to determine which spelling of the word is correct.

It may be desirable to provide a spellchecker that spellchecks a word in accordance with one or more styles of a language. A user may enter text into a document and be given the flexibility to choose one or more preferred styles of the language for the style-based spellchecker to apply to the document. The user may also be able to check his or her preferences in the style-based spellchecking tool so that he or she may select one correct spelling as per the user's preferred style. This disclosure describes spellchecking assistance for one or more styles in a language.

II. Example System Architecture

Figure 1:
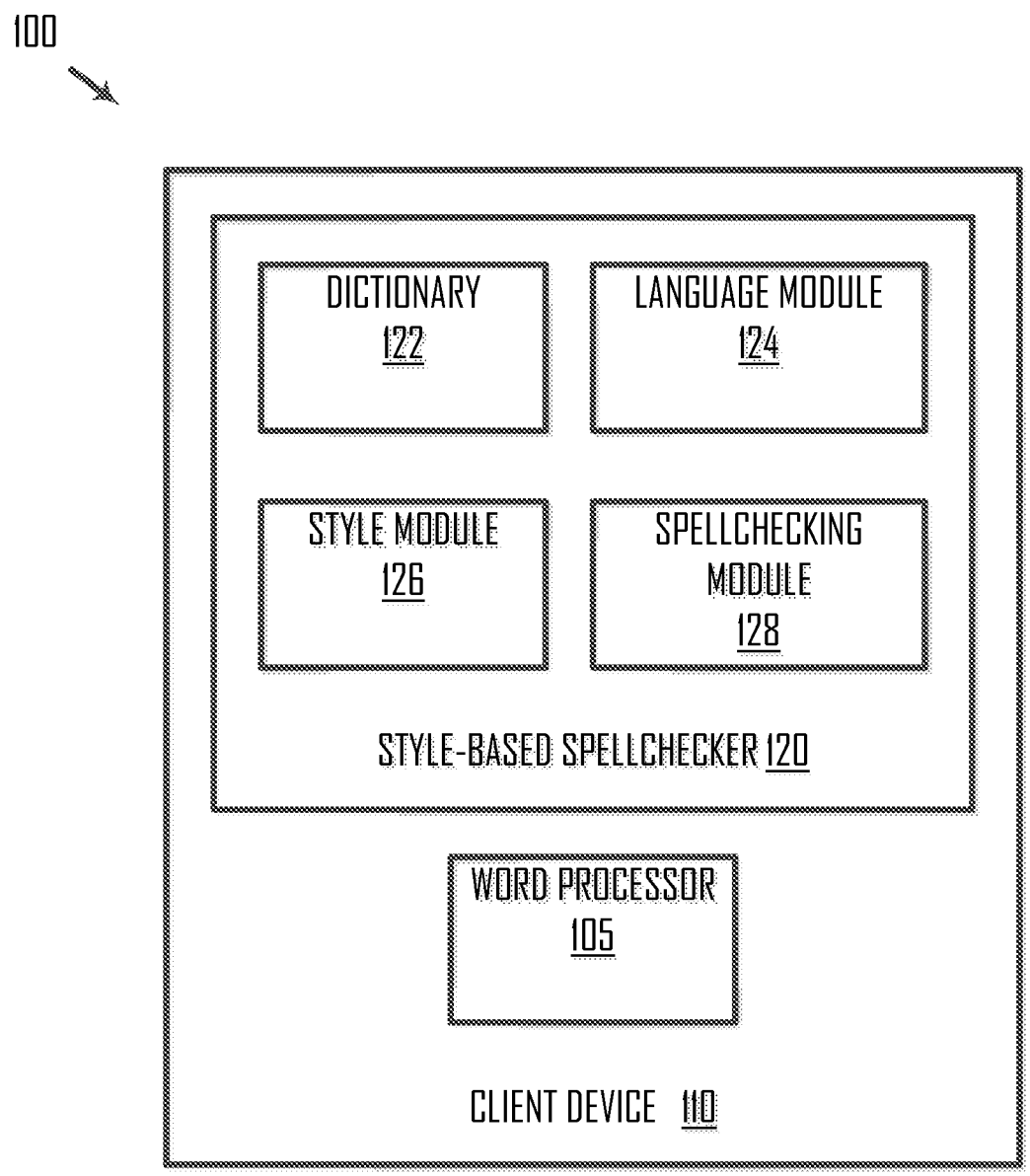
FIG. 1 is a simplified block diagram illustrating a system for providing style-based spellchecking, according to an embodiment.

FIG. 1 is a simplified block diagram 100 illustrating a system for providing spellchecking, according to an embodiment.

Diagram 100 includes a word processor 105 and a style-based spellchecker 120 running on a client 110. Client 110 may be any computing device such as a workstation, mobile device (e.g., a mobile phone, personal digital assistant, tablet, and laptop), computer, server, game console, set-top box, kiosk, embedded system, or other device having at least one processor and memory.

A. Style-Based Spellchecker

Style-based spellchecker 120 includes dictionary 122, language module 124, style module 126, and spellchecking module 128. Dictionary 122 may be a reference source listing words of a language. In an embodiment, dictionary 122 includes one or more words in a language having one or more styles. In an example, dictionary 122 includes a plurality of spellings of a word based one or more styles. For instance, dictionary 122 may include a first spelling of the word based on a standard spelling of the word (without a style) and a second spelling of the word based on a style. As such, dictionary 122 may include both the first and second spellings of the word.

The language may use an alphabet including a set of letters, and a word in the language may include a subset of the set of letters. As discussed above, Indo-Aryan languages may have one or more styles. In an example, the language is an Indo-Aryan language, and a style may include one or more diacritical marks applied to a word in the Indo-Aryan language (e.g., Hindi) or one or more homorganic nasal consonants. A homorganic nasal consonant may refer to particular consonants in the alphabet.

A diacritical mark may refer to a mark or a symbol added to a letter to indicate a special pronunciation. In an example, the diacritical mark is not a letter included in the alphabet and may represent one or more sounds from other languages that do not have a native character in the language. In an example, a first spelling of the word may be based on a first style, and the first spelling may include a first diacritical mark applied to one or more letters of the word. Additionally, a second spelling of the word may be based on a second style, and the second spelling may include a second diacritical mark applied to one or more letters of the word. The diacritical mark may be, for example, Devanagri Sign Anusvara (Anusvara), Devanagri Sign Candrabindu (Candrabindu), Devanagri Sign Nukta (Nukta), or Devanagri Sign Virama (Virama). These styles are described in more detail below.

Table A below includes four words and different ways to spell each of the four words based on Anusvara and Candrabindu.

TABLE A

| words | DEVANAGARI SIGN ANUSVARA (0902,ं) | DEVANAGARI SIGN CANDRABINDU (0901,ँ) |
| --- | --- | --- |
| Hāṁ | हां | हाँ |
| Ramˈganā | रंगना | रँगना |
| Hūṁ | ई | ई |
| Cāṁda | चांद | चाँद |

The words in Table A are in Hindi, which uses the Devanagari alphabet. Consonant letters in the Devanagari alphabet carry an inherent vowel that may be altered or muted using one or more diacritical marks. Vowels may be written as independent letters or by using a variety of diacritical marks that are written above, below, before, or after the consonant to which they belong. Table A includes words based on a first style Anusvara and a second style Candrabindu. Anusvara may be represented by Unicode character 0902, and the spelling of a word based on Anusvara may include a dot symbol applied above a letter in the word. Candrabindu may be represented by Unicode character 0901, and the spelling of a word based on Candrabindu may include a symbol having a dot inside the lower half of a circle applied above a letter in the word.

The different spellings of the words based on Anusvara and Candrabindu and may be included in dictionary 122. A word based on Anusvara and Candrabindu may have a common meaning and the same pronunciation or almost the same pronunciation in Hindi. Additionally, the spelling of the word includes the same letters in the Devanagari alphabet with different styles applied to one or more letters in the word.

In an embodiment, language module 124 receives a user selection of the language in which to spellcheck a document. The language may be, for example, an Indo-Aryan language (e.g., Hindi). This disclosure describes the language as being an Indo-Aryan language, but this is not intended to be limiting. Other languages having one or more styles are also within the scope of the disclosure.

In an embodiment, style module 126 receives a user selection of one or more selected styles of the language. A style may include one or more diacritical marks applied to a word in the selected language. A diacritical mark applied to the word may include Anusvara, Candrabindu, Nukta, and/or Virama. Another style may include one or more homorganic nasal consonants. This disclosure describes the style as being a diacritical mark or homorganic nasal consonant, but this is not intended to be limiting. Other styles that may be applied to a language are also within the scope of the disclosure.

In an embodiment, spellchecking module 128 identifies in the document a word applicable to the one or more selected styles and determines whether the dictionary includes one or more spellings of the word based on the one or more selected styles.

Not every word in the language may be spelled based on a style. In an example, a word may not be applicable to any styles. In this example, dictionary 122 may include only one spelling of the word. In another example, a word may be applicable to a first style (e.g., Anusvara) and not to a second style (e.g., Nukta). In this example, the first style may be applied to the word and the second style may not be applied to the word. Accordingly, dictionary 122 may include a spelling of the word based on the first style and may not include a spelling of the word based on the second style.

Spellchecking module 128 may determine whether dictionary 122 includes a spelling of the identified word based on a user selected style. In an example, dictionary 122 may include spellings of a word based on Anusvara and Candrabindu. In an example, the user may select only Anusvara as a preferred style. If the user spells a word based on Candrabindu and the spelling of the word based on Candrabindu is in dictionary 122, style-based spellchecker 120 may still flag the word as being misspelled because the user selected Anusvara as the style to apply. As such, words included in dictionary 122 and typed by the user in the document in word processor 102 may be determined, based on the user selected style preferences, by style-based spellchecker 120 as being misspelled. Style-based spellchecker 120 may assist the user in keeping a document consistent with one particular style. This is not intended to be limiting, and the user may select more than one style of the language to be applied to the document.

When spellchecking module 128 determines that dictionary 122 includes the spelling of the identified word based on the user selected style, spellchecking module 128 provides to the user the spelling of the identified word based on the user selected style. In keeping with the above example, spellchecking module 128 may determine that the spelling of the word based on Candrabindu in the document is misspelled and provide a spelling of the word based on Anusvara. The user may be provided with an option to accept or reject the provided spelling of the identified word. In an example, the user may choose to replace the identified word in the document with the provided spelling. As such, spellchecking module 128 may replace based on a user input the identified word in the document with the provided spelling of the identified word.

B. User Options and Preferences

Figure 2:
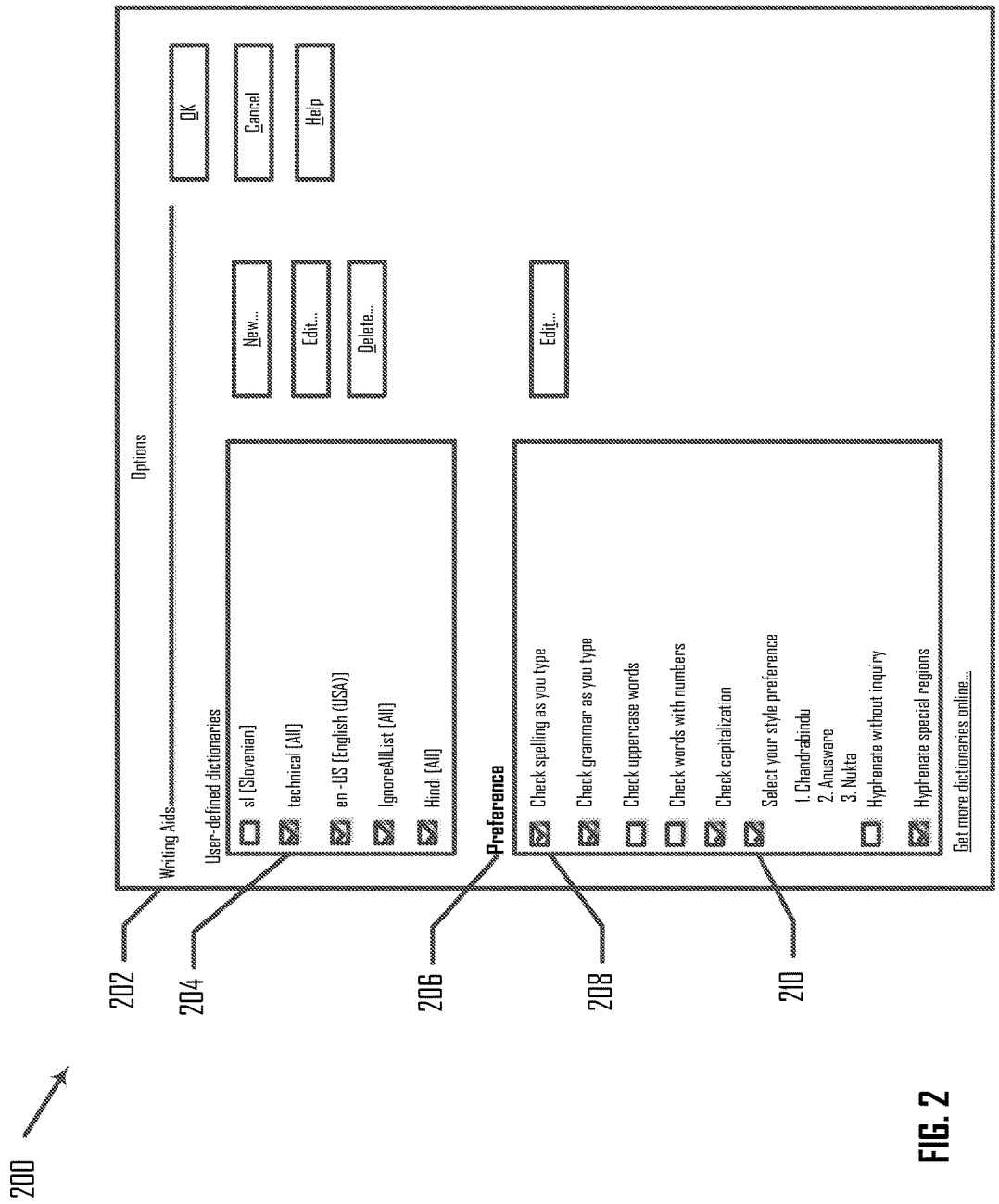
FIG. 2 is an example screenshot that enables a user to select a language and one or more preferred styles of the language for style-based spellchecking, according to an embodiment.

FIG. 2 is an example screenshot 200 that enables a user to select a language and one or more preferred styles of the language for style-based spellchecking, according to an embodiment.

Screenshot 300 includes a dialogue box 202 including a user-defined dictionaries option 204 and a style preference option 206. User-defined dictionaries option 204 includes five options: sl[Slovenian], technical [All], en-US [English (USA)], IgnoreAllList [All], and Hindi [All]. The user may select one or more options in user-defined dictionaries option 204. In screenshot 200, each of the options technical [All], en-US [English(USA)], IgnoreAllList [All], and Hindi [All] have checkmarks next to their names, indicating that these options have been selected.

Style preference option 206 includes eight options: "Check spelling as you type" option 208, "Check grammar as you type," "Check uppercase words," "Check capitalization," "Select your style preference" option 210, "Hyphenate without inquiry," and "Hyphenate special regions." The user may select one or more options in style preference option 206. In screenshot 200, each of the options "Check spelling as you type" option 208, "Check grammar as you type," "Check capitalization," "Select your style preference" option 210, and "Hyphenate special regions" have checkmarks next to their names, indicating that these options have been selected. The above example options are not intended to be limiting, and other options may be used.

"Select your style preference" option 210 includes three different styles, Candrabindu, Anusvara, and Nukta. The user selection of the styles may include first, second, and third selected styles of the language, and each of the selected styles may be ranked based on user preference. The first selected style may have a higher user preference than the second and third selected style, and the second selected style may have a higher user preference than the third selected style. "Select your style preference" option 210 may include more styles and user preferences than the three listed in FIG. 2. For example, the user may have the option of selecting homorganic nasal consonants (e.g., Devanagari letter NGA, Devanagari letter NYA, Devanagari letter NNA, Devanagari letter NA and Devanagari letter MA) instead of Anusvara and vice versa. Homorganic nasal conjunct consonants can be replaced with Anusvara and so different styles for writing a single word emerge (e.g., Table G below). In another example, the user may have the option of selecting the Shrutimulak style (e.g., glidal Devanagari letter YA and Devanagari letter VA versus use of vowels like Devanagari letter E and Devanagari letter AA).

For simplicity, two different user selections of styles will be described. It should be understood that the description may also pertain to more than two styles. In an example, the user selection includes first and second selected styles of the language, and the first selected style has a higher user preference than the second selected style. Different spelling variants of a word may be correct, but spellchecker module 128 may show the appropriate spelling suggestions based on the user's ranked preferences. Referring back to Table A, the user may type a word in in a document in word processor 105, and spellchecking module 128 may identify the word as being applicable to Anusvara and Candrabindu. In an example, Candrabindu is the user's first selected style preference, Anusvara is the user's second selected style preference, and Candrabindu has a higher user preference than Anusvara.

When spellchecking module 128 determines that dictionary 122 includes the spelling of the word based on the user's highest ranked style preference, spellchecking module 128 provides to the user the spelling of the word based on the user's highest ranked style preference. When spellchecking module 128 determines that dictionary 122 does not include the spelling of the word based on the user's highest ranked style preference (e.g., Candrabindu), spellchecking module 128 may determine whether dictionary 122 includes a spelling of the word based on the user's next highest ranked style preference (e.g., Anusvara). When spellchecking module 128 determines that dictionary 122 includes the spelling of the word based on the user's next highest ranked style preference, spellchecking module 128 may provide to the user the spelling of the word based on the user's next highest ranked style preference. Spellchecking module 128 may continue to go down the list of the user's ranked style preferences to determine whether dictionary 122 includes the applicable spelling of the word.

When spellchecking module 128 determines that dictionary 122 does not include each of the one or more spellings of the word based on each of the one or more selected styles (e.g., Candrabindu and Anusvara), spellchecking module 128 determines whether dictionary 122 includes a spelling of the word exclusive of each of the one or more selected styles. When spellchecking module 128 determines that dictionary 122 includes the spelling of the word exclusive of each of the one or more selected styles, spellchecking module 128 may determine that the word is correctly spelled. Alternatively, when spellchecking module 128 determines that dictionary 122 does not include the spelling of the word exclusive of each of the one or more selected styles, spellchecking module 128 may determine that the word is misspelled. Spellchecking module 128 may flag in the document one or more words determined as being misspelled.

As discussed above and further emphasized here, FIG. 1-2 are merely examples, which should not unduly limit the scope of the claims. For example, although block diagram 100 is described herein with reference to a document in word processor 105, the document may be in a text editor or any application in which a user may enter text (e.g., spreadsheet application, slide presentation application, and web browser).

Further, it should be understood that one or more modules (e.g., language module 124, style module 126, and spellchecking module 128) in FIG. 1 may be combined with another module. In an example, at least one of language module 124, style module 126, and spellchecking module 128 is combined into one module. It should also be understood that one or more modules in FIG. 1 may be separated into more than one module. In an example, spellchecking module 124 is split into a first spellchecking module and a second spellchecking module (not shown). The first spellchecking module may be associated with a first style of the language, and a second spellchecking module may be associated with a second style of the language.

Additionally, components of style-based spellchecker 120 in FIG. 1 may reside in a machine different from that shown in FIG. 1. For example, in another embodiment, style-based spellchecker 120 is coupled to a network and includes language module 124, style module 126, and spellchecking module 128. Dictionary 122 may be coupled to the network, and style-based spellchecker 120 may access dictionary 122 via the network.

The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Further, although FIG. 2 illustrates a graphical user interface (GUI) that displays options to the user to enable the user to select a language and one or more preferred styles of the language for style-based spellchecking, other embodiments may accept the user selections in a different manner. For example, in another embodiment, the user may select a language and one or more preferred styles of the language by entering one or more commands into a command line, speaking the user's selections into a microphone coupled to style-based spellchecker 120, or touching a touch-sensitive screen coupled to style-based spellchecker 120.

C. Example Styles

As discussed, a language (e.g., an Indo-Aryan language) may have one or more styles, and a style may include one or more diacritical marks or one or more homorganic nasal consonants.

Table B below includes four words and different ways to spell each of the four words based on Nukta and not applying Nukta.

TABLE B

| | Subscript dot DEVANAGARI SIGN NUKTA (093C, ़) for Persian, Arabic and English Sound | |
|---|---|---|
| Words | W/ Subscript dot DEVANAGARI SIGN NUKTA(093C़) | W/o Subscript dot DEVANAGARI SIGN NUKTA (093C़) |
| Qāyal | क़ायल | क़ायल |
| Rāz | राज़ | राज |
| Fā'il | फ़ाइल | फाइल |
| K̲h̲ātir | ख़ातिर | खातिर |

Table B includes words in Hindi based on applying Nukta and not applying Nukta. The different spellings of these words are based on subscript dot Devanagari Sign Nukta and without subscript dot Devanagari Sign Nukta. A word based on Nukta and not applying Nukta may have the same pronunciation or almost the same pronunciation and includes the same letters in the Devanagari alphabet. Nukta may be represented by Unicode character 0903, and the spelling of a word based on Nukta may include a subscript dot symbol applied to a letter in the word. The spelling of the word without Nukta does not include the subscript dot. Dictionary 122 may include a plurality of spellings of the words in Table B based on Nukta and not applying Nukta. The plurality of spellings of the words in Table B may have a common meaning in Hindi.

Table C below includes five words and different ways to spell each of the five words based on Anusvara and homorganic nasal consonants.

TABLE C

| Words | DEVANAGARI SIGN ANUSVARA (0902ं) | Homorganic Nasal consonants |
|---|---|---|
| Aṅk | अंक | अङ्क |
| Hindī | हिंदी | हिन्दी |
| Cañcala | चंचल | चञ्चल |
| Paṇḍā | पंडा | पण्डा |
| LambāT | लंबाई | लम्बाई |

The different spellings of these words in Table C are based on a first style using Anusvara and a second style using homorganic nasal consonants. A word based on Anusvara and a homorganic nasal consonant may have the same pronunciation or almost the same pronunciation. Dictionary 122 may include a plurality of spellings of the words in Table C based on a first style Anusvara and a second style homorganic nasal consonant. The plurality of spellings of the words in Table C may have a common meaning in Hindi. Homorganic nasal consonants may be represented by the Unicode character 0919, 091E, 0923, 0928, or 092E.

Table D below includes the different letters of five homorganic nasal consonants and their associated Unicode characters.

Table D.

Superscript dot DEVANAGARI SIGN ANUSVARA (0902, ं) VS Homorganic Nasal consonants DEVANAGARI LETTER NGA (0919, ङ), DEVANAGARI LETTER NYA (091E, ञ), DEVANAGARI LETTER NNA (0923, ण), DEVANAGARI LETTER NA (0928, न), and DEVANAGARI LETTER MA (092E, म)

Dictionary 122 may include a first spelling of a word based on Anusvara, and a second spelling of the word based on a homorganic nasal consonant, and the second spelling may include the homorganic nasal consonant and an adjacent letter after the homorganic nasal consonant. In an example, when, in the second spelling, the homorganic nasal consonant is joined with the adjacent letter, the first and second spellings are equivalent.

Table E below includes two of the words from Table C and joining a homorganic nasal consonant with the adjacent letter.

TABLE E

| Words | DEVANAGARI SIGN ANUSVARA(0902, ◌ं) | Homorganic Nasal consonants (DEVANAGARI LETTER NGA, NYA, NNA, NA and MA) |
|---|---|---|
| Aṅk | अकं = अ + ◌ं + क | अङ्‌क = अ + ङ्‌ + क |
| Hindī | हिंदी = हि + ◌ं + दी | हिन्दी = हि + न्‌ + दी |
| Cañcala | चंचल = च + ◌ं + च + ल | चञ्चल = च + ञ्‌ + च + ल |
| Paṇḍā | पंडा = प + ◌ं + डा | पण्डा = प + ण्‌ + डा |
| Lambāī | लंबाई = ल + ◌ं + बा + ई | लम्बाई = ल + म्‌ + बा + ई |

The words above are based on a single style. This is not intended to be limiting. In another example, a word may be based on a plurality of styles. For instance, a word may be based on a plurality of diacritical marks, and the plurality of diacritical marks may be applied to the word.

Table F below includes a word and different ways to spell the words based on different styles.

TABLE F

| Words | DEVANAGARI SIGN CANDRABINDU (0901 ◌ँ) with DEVANAGARI SIGN NUKTA (093C ◌़) | DEVANAGARI SIGN CANDRABINDU (0901 ◌ँ) without DEVANAGARI SIGN NUKTA (093C ◌़) | DEVANAGARI SIGN ANUSVARA (0902 ◌ं) with DEVANAGARI SIGN NUKTA (093C ◌़) | DEVANAGARI SIGN ANUSVARA (0902 ◌ं) without DEVANAGARI SIGN NUKTA (093C ◌़) |
|---|---|---|---|---|
| Amgrēz | अँग्रेज़ | अँग्रेज | अंग्रेज़ | अंग्रेज |
| Khūmkhār | खूँख़ार | खूँखार | खूंख़ार | खूंखार |

Table F includes a word in Hindi with different spellings based on applying one or more styles to the word. A first spelling of the word is based on Candrabindu and Nukta, a second spelling of the word is based on Candrabindu without Nukta, a third spelling of the word is based on Anusvara and Nukta, and a fourth spelling of the word is based on Anusvara without Nukta. The first and third spellings of the words are based on two different styles. Dictionary 122 may include a plurality of spellings of the words in Table F based on these styles. These different spellings of the word may have the same pronunciation or almost the same pronunciation and include the same letters in the Devanagari alphabet, and may have a common meaning in Hindi.

Table G below includes an illustration of a style being joined with a letter in the alphabet.

TABLE G

How Chandravindu (◌ँ) joins with Devanagari Alphabet

अ + ◌ँ = अँ

How Anusvara (◌ं) joins with Devanagari Alphabet

अ + ◌ं = अं

How Nukta (◌़) joins with Devanagari Alphabet

ज + ◌़ = ज़

In the first row, Candrabindu is joined with a letter in the Devanagari alphabet. In the second row, Anusvara is joined with a letter in the Devanagari alphabet. In the third row, Nukta is joined with a letter in the Devanagari alphabet.

This disclosure describes examples of styles that may be applied to a word. A user may prefer Chandravindu, and another user may prefer Anusvara instead of Chandravindu. Additionally, a user may prefer homorganic nasal consonants and another user may prefer Anusvara for homorganic nasal consonants that may be joined with an adjacent letter. A user may prefer Nukta, and another user may prefer to not use Nukta. Further, a user may prefer to use the Shrutimulak style (e.g., glidal Devanagari letter YA and Devanagari letter VA and a user may use vowels Devanagari letter E and Devanagari letter AA instead of the Devanagari letter YA and Devanagari letter VA). The above combination may or may not come together as well. Other styles and combinations applied to the word are also within the scope of this disclosure.

III. Example Method

Figure 3:
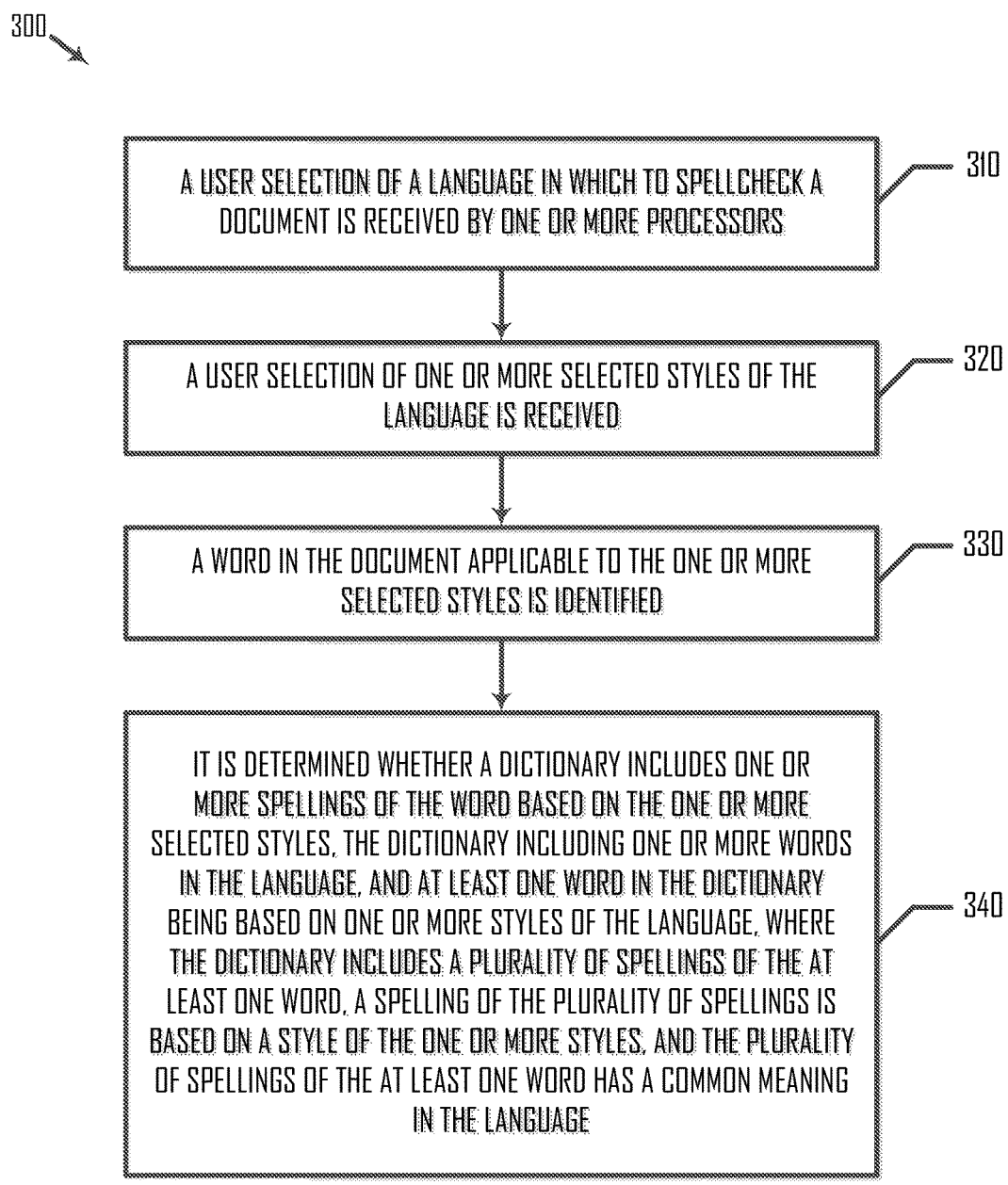
FIG. 3 is a simplified flowchart illustrating a method of providing style-based spellchecking, according to an embodiment.

FIG. 3 is a simplified flowchart illustrating a method of providing style-based spellchecking, according to an embodiment. Method 300 is not meant to be limiting and may be used in other applications.

Method 300 includes steps 310-340. In a step 310, a user selection of a language in which to spellcheck a document is received by one or more processors. In an example, language module 124 receives, by one or more processors, a user selection of a language in which to spellcheck a document. In a step 320, a user selection of one or more selected styles of the language is received. In an example, style module 126 receives a user selection of one or more selected styles of the language. In a step 330, a word in the document applicable to the one or more selected styles is identified. In an example, spellchecking module 128 identifies in the document a word applicable to the one or more selected styles.

In a step 340, it is determined whether a dictionary includes one or more spellings of the word based on the one or more selected styles, the dictionary including one or more words in the language, and at least one word in the dictionary being based on one or more styles of the language, where the dictionary includes a plurality of spellings of the at least one word, a spelling of the plurality of spellings is based on a style of the one or more styles, and the plurality of spellings of the at least one word has a common meaning in the language. In an example, spellchecking module 128 determines whether a dictionary includes one or more spellings of the word based on the one or more selected styles, the dictionary including one or more words in the language, and at least one word in the dictionary being based on one or more styles of the language, where the dictionary includes a plurality of spellings of the at least one word, a spelling of the plurality of spellings is based on a style of the one or more styles, and the plurality of spellings of the at least one word has a common meaning in the language.

It is also understood that additional method steps may be performed before, during, or after steps 310-340 discussed above. For example, method 300 may include a step of providing to a user the spelling of the identified word based on a selected style. It is also understood that one or more of the steps of method 300 described herein may be omitted, combined, or performed in a different sequence as desired.

IV. Example Computing System

Figure 4:
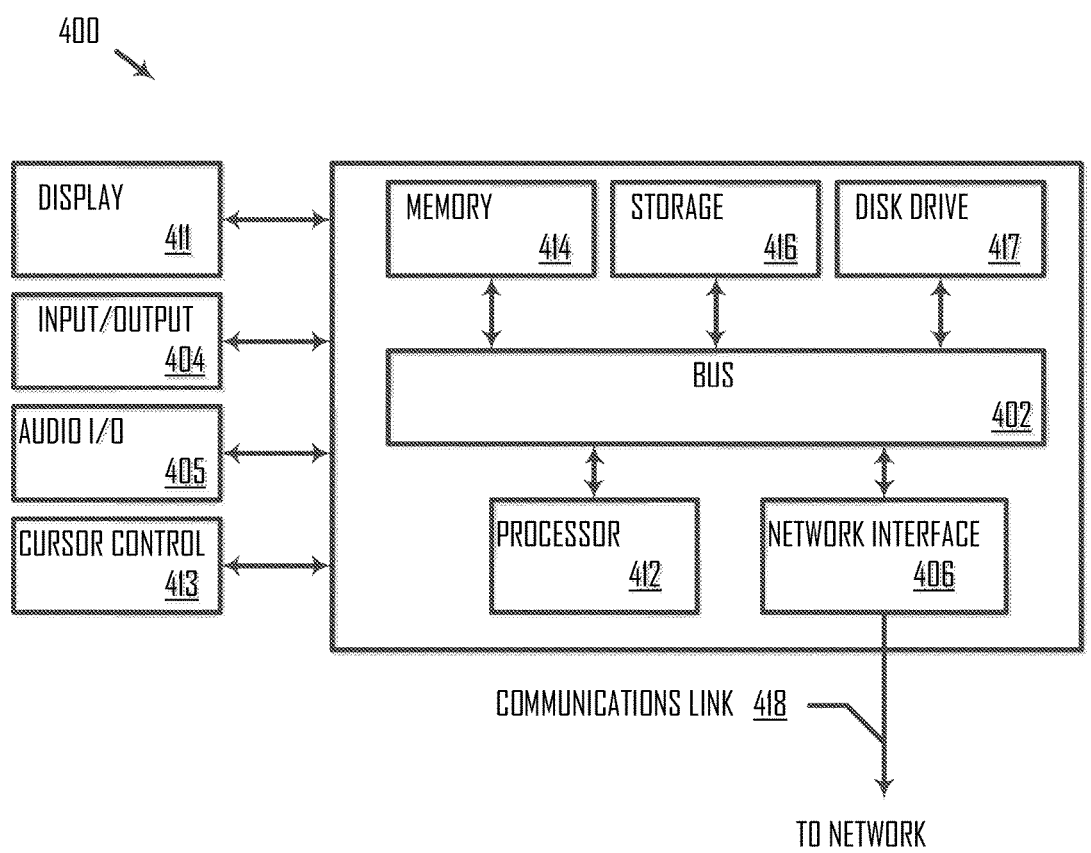
FIG. 4 is a block diagram of a computer system suitable for implementing one or more embodiments of the present disclosure.

FIG. 4 is a block diagram of a computer system 400 suitable for implementing one or more embodiments of the present disclosure. In various implementations, host machine 101 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. A processor 412, which may be a microcontroller, digital signal processor (DSP), or other processing component, processes these various signals, such as for display on computer system 400 or transmission to other devices via communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A system for providing style-based spellchecking, the system comprising:
   a memory that stores a dictionary including one or more words in a language, wherein at least one word in the dictionary is based on one or more styles of the language,
   wherein the dictionary includes a plurality of spellings of the at least one word, a spelling of the plurality of spellings is based on a style of the one or more styles, and the plurality of spellings of the at least one word has a common meaning in the language;
   a language module that provides a graphical user interface (GUI) including a set of languages selectable by a user and receives a user selection of the language of the set of languages in which to spellcheck a document;
   a style module that identifies the set of styles of the language, provides a GUI including the set of styles, and receives a user selection of one or more selected styles of the set of styles, wherein a first selected style of the one or more selected styles is represented by a Unicode character; and
   a spellchecking module that identifies in the document a word applicable to the one or more selected styles, determines whether the dictionary includes one or more spellings of the word based on the one or more selected styles, and determines that a spelling of the one or more spellings of the word is correct if the spelling includes the first selected style represented by the Unicode character.

2. The system of claim 1, wherein the style of the one or more styles includes one or more diacritical marks applied to a word of the at least one word.

3. The system of claim 2, wherein the language uses an alphabet including a set of letters, and a word of the at least one word includes a subset of the set of letters,
   wherein a second spelling of the plurality of spellings is based on a second style of the one or more styles, and
   wherein the first spelling includes a first diacritical mark applied to one or more letters of the subset of letters, and the second spelling includes a second diacritical mark applied to one or more letters of the subset of letters.

4. The system of claim 1, wherein the spellchecking module determines whether the dictionary includes a spelling of the identified word based on the first selected style of the one or more selected styles, and
   when the spellchecking module determines that the dictionary includes the spelling of the identified word based on the first selected style, the spellchecking module provides to a user the spelling of the identified word based on the first selected style.

5. The system of claim 4, wherein the spellchecking module replaces based on a user input the identified word in the document with the provided spelling of the identified word.

6. The system of claim 4, wherein the user selection of the one or more selected styles includes the first and second selected styles of the language, and the first selected style has a higher user preference than the second selected style.

7. The system of claim 6, wherein when the spellchecking module determines that the dictionary does not include the spelling of the identified word based on the first selected style, the spellchecking module determines whether the dictionary includes a spelling of the identified word based on the second selected style, and
   when the spellchecking module determines that the dictionary includes the spelling of the identified word based on the second selected style, the spellchecking module provides to the user the spelling of the identified word based on the second selected style.

8. The system of claim 1, wherein when the spellchecking module determines that the dictionary does not include each of the one or more spellings of the identified word based on each of the one or more selected styles, the spellchecking module determines whether the dictionary includes a spelling of the identified word exclusive of each of the one or more selected styles,
   wherein when the spellchecking module determines that the dictionary includes the spelling of the identified word exclusive of each of the one or more selected styles, the spellchecking module determines that the identified word is correctly spelled, and
   when the spellchecking module determines that the dictionary does not include the spelling of the identified word exclusive of each of the one or more selected styles, the spellchecking module determines that the identified word is misspelled.

9. The system of claim 8, wherein the spellchecking module flags in the document one or more words determined as being misspelled.

10. The system of claim 1, wherein the language is an Indo-Aryan language.

11. The system of claim 10, wherein the style of the one or more styles is at least one of Anusvara, Candrabindu, Nukta, and Virama.

12. The system of claim 11, wherein a second style of the one or more styles is one or more homorganic nasal consonants.

13. The system of claim 12, wherein the plurality of spellings of a word of the at least one word includes a first spelling of the word based on Anusvara, a second spelling of the word based on a homorganic nasal consonant, and the second spelling includes the homorganic nasal consonant and an adjacent letter after the homorganic nasal consonant, and
   wherein when, in the second spelling, the homorganic nasal consonant is joined with the adjacent letter, the first and second spellings are equivalent.

14. A method of providing style-based spellchecking, the method comprising:
   displaying a graphical user interface (GUI) including a set of languages selectable by a user to a display;
   receiving, by one or more processors, a user selection of a language of the set of languages in which to spellcheck a document;
   determining a set of styles of the selected language;
   displaying a GUI including the set of styles of the language, wherein each style of the set of styles is selectable by the user;
   receiving a user selection of one or more selected styles of the set of styles, wherein a first style of the one or more selected styles is represented by a Unicode character;
   identifying in the document a word applicable to the one or more selected styles;
   determining whether a dictionary includes one or more spellings of the word based on the one or more selected styles, the dictionary including one or more words in the language, and at least one word in the dictionary being based on one or more styles of the language, wherein the dictionary includes a plurality of spellings of the at least one word, a spelling of the plurality of spellings is based on a style of the one or more styles, and the plurality of spellings of the at least one word has a common meaning in the language; and determining that a spelling of the one or more spellings of the word is correct if the spelling includes the first style represented by the Unicode character.

15. The method of claim 14, wherein the style of the one or more styles includes one or more diacritical marks applied to a word of the at least one word.

16. The method of claim 15, wherein the language uses an alphabet including a set of letters, and a word of the at least one word includes a subset of the set of letters, wherein a second spelling of the plurality of spellings is based on a second style of the one or more styles, and wherein the first spelling includes a first diacritical mark applied to one or more letters of the subset of letters, and the second spelling includes a second diacritical mark applied to one or more letters of the subset of letters.

17. The method of claim 14, further comprising:

determining whether the dictionary includes a spelling of the identified word based on the first selected style of the one or more selected styles;

when the dictionary is determined to include the spelling of the identified word based on the first selected style, providing to a user the spelling of the identified word based on the first selected style; and replacing based on a user input the identified word in the document with the provided spelling of the identified word.

18. The method of claim 17, wherein the receiving a user selection includes receiving the first selected style and a second selected style, the method further comprising:

when the dictionary is determined to not include the spelling of the identified word based on the first selected style, determining whether the dictionary includes a spelling of the identified word based on the second selected style, the first selected style having a higher user preference than the second selected style;

when the dictionary is determined to include the spelling of the identified word based on the second selected style, providing the spelling of the identified word based on the second selected style to the user;

when the dictionary is determined to not include each of the one or more spellings of the identified word based on each of the one or more selected styles, determining whether the dictionary includes a spelling of the identified word exclusive of each of the one or more selected styles;

when the dictionary is determined to include the spelling of the word exclusive of each of the one or more selected styles, determining that the identified word is correctly spelled;

when the dictionary is determined to not include the spelling of the word exclusive of each of the one or more selected styles, determining that the identified word is misspelled; and flagging in the document one or more words determined as being misspelled.

19. The method of claim 14, wherein the language is an Indo-Aryan language, and the style of the one or more styles is at least one of a diacritical mark and a homorganic nasal consonant.

20. A non-transitory machine-readable medium comprising a plurality of machine-readable instructions that when executed by one or more processors are adapted to cause the one or more processors to perform a method comprising:

displaying a graphical user interface (GUI) including a set of languages selectable by a user to a display;

receiving a user selection of a language of the set of languages in which to spellcheck a document;

determining a set of styles of the selected language;

displaying a GUI including the set of styles of languages, wherein each style of the set of styles is selectable by the user;

receiving a user selection of one or more selected styles of the set of styles, wherein a first style of the one or more selected styles is represented by a Unicode character;

identifying in the document a word applicable to the one or more selected styles;

determining whether a dictionary includes one or more spellings of the word based on the one or more selected styles, the dictionary including one or more words in the language, and at least one word in the dictionary being based on one or more styles of the language, wherein the dictionary includes a plurality of spellings of the at least one word, a spelling of the plurality of spellings is based on a style of the one or more styles, and the plurality of spellings of the at least one word has a common meaning in the language; and determining that a spelling of the one or more spellings of the word is correct if the spelling includes the first style represented by the Unicode character.

* * * * *